E. B. MOORE.
AUXILIARY HANDLE FOR SHOVELS.
APPLICATION FILED NOV. 5, 1912.
1,074,889.
Patented Oct. 7, 1913.
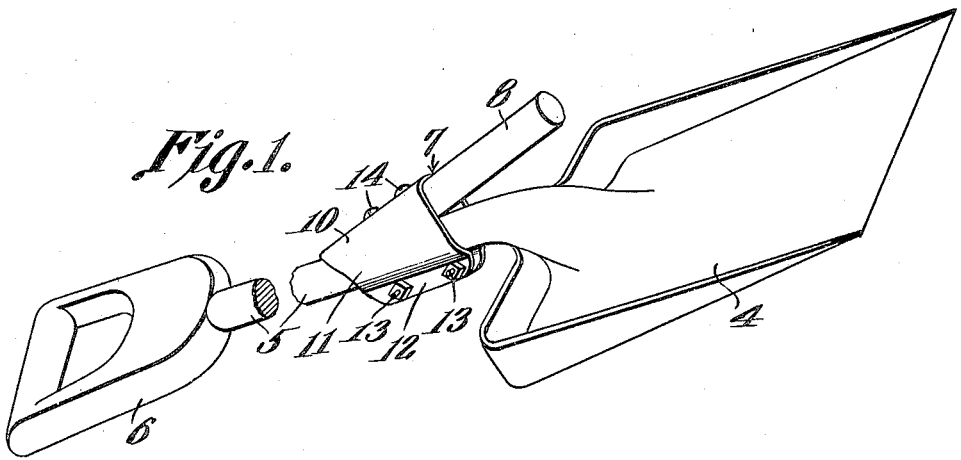
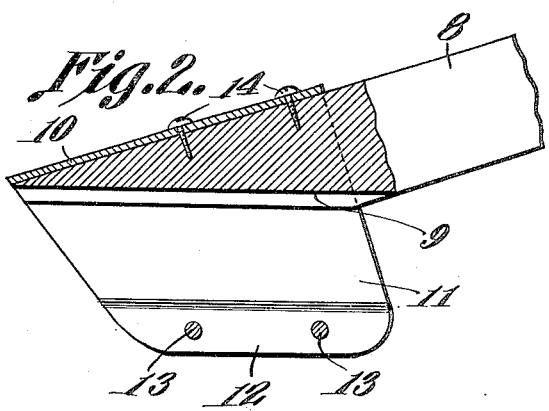
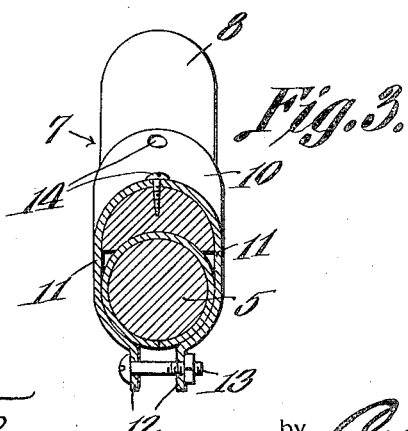
E. B. Moore,
Inventor

UNITED STATES PATENT OFFICE.

EDWARD B. MOORE, OF NEWARK, OHIO.

AUXILIARY HANDLE FOR SHOVELS.

1,074,889.

Specification of Letters Patent.

Patented Oct. 7, 1913.

Application filed November 5, 1912. Serial No. 729,706.

*To all whom it may concern:*

Be it known that I, EDWARD B. MOORE, a citizen of the United States, residing at Newark, in the county of Licking and State of Ohio, have invented a new and useful Auxiliary Handle for Shovels, of which the following is a specification.

This invention appertains to auxiliary or supplemental handles for shovels, spades, scoops, and the like, and aims primarily to provide a device of this character which is adapted to be attached to the shovel or scoop handle in such a manner that the shovel or scoop may be employed in the manner of a hand scoop.

This invention also contemplates the provision of an attachment of the character indicated which may be applied to the shovel or scoop handle in a facile, expeditious and efficient manner, and in order to balance or equalize the load.

A further object of the present invention is to provide such an attachment which may be adjusted to various points along the shovel or scoop handle in order to conform to the dictates of convenience or necessity, or to conform to the whim of the operator.

To the above and other ends, which will appear as the description proceeds, the invention resides in the combination and arrangement of parts and in the details of construction hereinafter described and claimed, it being understood that changes in the precise embodiment of the invention can be made within the scope of what is claimed without departing from the spirit of the invention.

The preferred embodiment of the invention has been illustrated in the accompanying drawing; wherein:—

Figure 1 is a perspective view of the attachment as applied to a shovel, part of the shovel handle being broken away. Fig. 2 is a longitudinal sectional view of the attachment, part of the auxiliary handle being broken away. Fig. 3 is a transverse sectional view of the attachment as applied to the shovel handle.

Referring specifically to the drawing, the shovel illustrated comprises the usual blade 4, handle 5 and the hand hold or grip 6, the details of which are of no moment, as it is understood that this attachment is applicable to various shovels, spades, scoops and the like with equal propriety.

The attachment forming the subject matter of the present invention has been designated generally by the numeral 7, and consists in its essentials of an auxiliary handle and a clamp adapted to embrace the shovel or scoop handle.

The auxiliary handle has been designated by the numeral 8, the same being preferably fashioned from wood or any other suitable material, and having one end beveled or cut obliquely as designated by the numeral 9, the said end also being grooved or concaved so as to fit the side of the shovel or scoop handle. This auxiliary handle 8 is of any preferable length and diameter, the inclination or bevel of the end 9 being such as to hold the auxiliary handle at the desired angular position relative to the shovel or scoop handle when the attachment is applied to the latter.

The clamp is bent from a blank of sheet metal, which is doubled to form a back 10 and the cheeks 11 the edges of the cheeks being offset toward each other to provide the flanges 12. A pair of bolts or other draft members 13 pass through the flanges 12 in order to draw the flanges together so as to tighten the clamp about the shovel or scoop handle. The back of the clamp is secured over the end of the auxiliary handle by means of screws or other securing members 14. The beveled and concaved end 9 of the auxiliary handle is therefore disposed between the cheeks 11.

In use, the bolts 13 are removed so as to permit the cheeks 11 to straddle the shovel or scoop handle to bring the end 9 against the side of the shovel or scoop handle so that the auxiliary handle diverges and projects forwardly from the shovel or scoop handle. The bolts 13 are then again inserted through the flanges 12, and are tightened so that the clamp tightly embraces the shovel or scoop handle and the end of the auxiliary handle. The auxiliary handle is thus firmly secured or clamped to the shovel or scoop handle, and it will be evident that the auxiliary handle may be clamped at any suitable point to the shovel or scoop handle. When the auxiliary handle is clamped to the forward or outer end of the shovel handle, the same will project forwardly or outwardly over the blade and will therefore project over the load or center of gravity in such a manner as to balance or equalize the load. The present attachment therefore permits of the use of the shovel or scoop in the manner of an ordinary hand scoop, one hand only being employed, so that the other hand is free to hold a bag or to be otherwise employed. The clamp in embracing the shovel handle will also draw the beveled and concaved end 9 firmly against the side of the shovel handle so as to effectively hold the auxiliary handle rigid with the shovel handle, it also being possible to adjust the handle to one side or the other, as may be desirable. Thus, the auxiliary handle may be positioned as desired in order to suit various circumstances, and the same may be also readily and conveniently applied to the shovel handle.

Having thus described the invention, what is claimed as new is:—

1. A shovel or scoop attachment embodying an auxiliary handle having one end beveled to fit against the side of the shovel or scoop handle, and a clamp adapted to embrace the shovel or scoop handle and the beveled end of the auxiliary handle to clamp them together.

2. A shovel or scoop attachment embodying an auxiliary handle having one end beveled and concaved to fit against the side of the shovel or scoop handle, and a clamp secured over the said end of the auxiliary handle and adapted to fit over the shovel or scoop handle so as to embrace the said end of the auxiliary handle and the shovel or scoop handle to retain them firm relative to each other.

3. A shovel or scoop attachment embodying an auxiliary handle having one end beveled to fit against the side of a shovel or scoop handle, a clamp secured over the said end of the auxiliary handle and including cheeks to straddle the shovel or scoop handle, and draft members connecting the edges of the cheeks to clamp them over the shovel or scoop handle.

4. A shovel or scoop attachment embodying an auxiliary handle having one end beveled and concaved to fit against the side of the shovel or scoop handle, a clamp bent from a blank of sheet metal, doubled to form a back and cheeks, the back being secured over the said end of the auxiliary handle and the cheeks being designed to straddle the shovel or scoop handle, the edges of the cheeks being offset toward each other to provide flanges, and draft members connecting the flanges.

In testimony that I claim the foregoing as my own, I have hereto affixed my signature in the presence of two witnesses.

EDWARD B. MOORE.

Witnesses:
 MAUDE BOTTS,
 JOHN MARTIN.

---

Copies of this patent may be obtained for five cents each, by addressing the "Commissioner of Patents, Washington, D. C."